(12) United States Patent
Chiwata

(10) Patent No.: US 7,846,022 B2
(45) Date of Patent: Dec. 7, 2010

(54) GAME INPUT DEVICE, GAME METHOD AND GAME SYSTEM USING THE SAME

(75) Inventor: Hiroyuki Chiwata, El Segundo, CA (US)

(73) Assignee: Konami Digital Entertainment, Inc., El Segundo, CA (US)

( * ) Notice: Subject to any disclaimer, the term of this patent is extended or adjusted under 35 U.S.C. 154(b) by 558 days.

(21) Appl. No.: 11/890,378

(22) Filed: Aug. 6, 2007

(65) Prior Publication Data

US 2009/0042650 A1 Feb. 12, 2009

(51) Int. Cl.
*A63F 13/02* (2006.01)
(52) U.S. Cl. .................. 463/35; 463/7; 463/37
(58) Field of Classification Search ............... 463/7, 463/30–31, 35–38; 84/609, 610
See application file for complete search history.

(56) References Cited

U.S. PATENT DOCUMENTS 6,225,547 B1 * 5/2001 Toyama et al. ................ 84/611
6,347,998 B1 * 2/2002 Yoshitomi et al. ............. 463/42
6,390,923 B1 * 5/2002 Yoshitomi et al. ............. 463/43
7,044,857 B1 * 5/2006 Klitsner et al. ................ 463/35
7,297,864 B2 * 11/2007 Ueshima et al. ............... 84/724

FOREIGN PATENT DOCUMENTS

JP  2001-013959  1/2001
JP  2001-293246  10/2001

* cited by examiner

*Primary Examiner*—Melba Bumgarner
*Assistant Examiner*—Alex F. R. P. Rada, II
(74) *Attorney, Agent, or Firm*—Masuvalley and Partners

(57) ABSTRACT

The objective of present invention is to provide a game input device which allows a player to enjoy the feeling of actually playing a musical instrument along with a rhythm of music, a game method and a game system using such a game input device. The present invention is a game input device having a moving portion and a neck portion, the moving portion has at least two or more inputs, the moving portion is provided onto the neck portion, and the position of the moving portion is movable on the neck portion. The present invention is also a game method and a game system using the game input device.

14 Claims, 13 Drawing Sheets

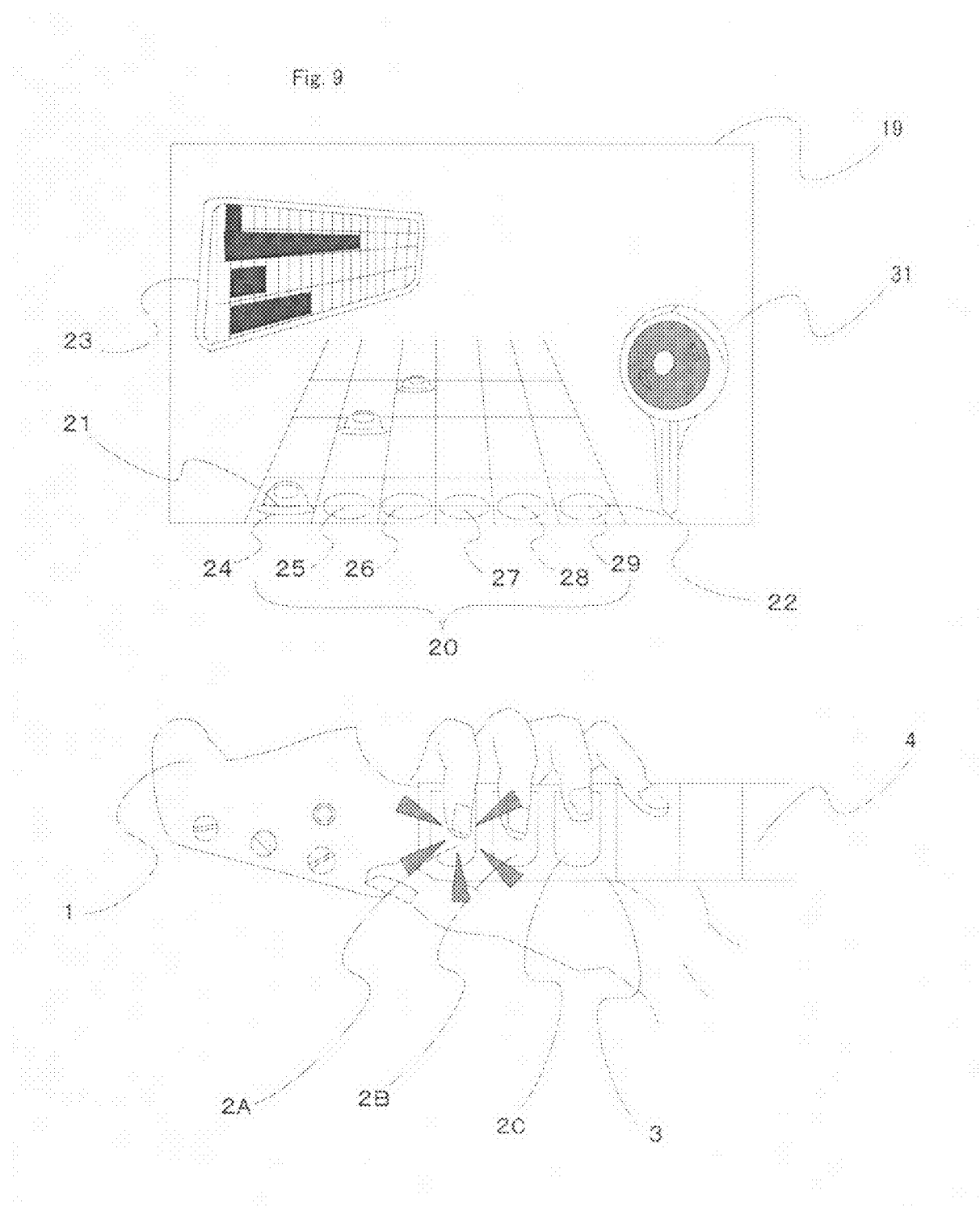

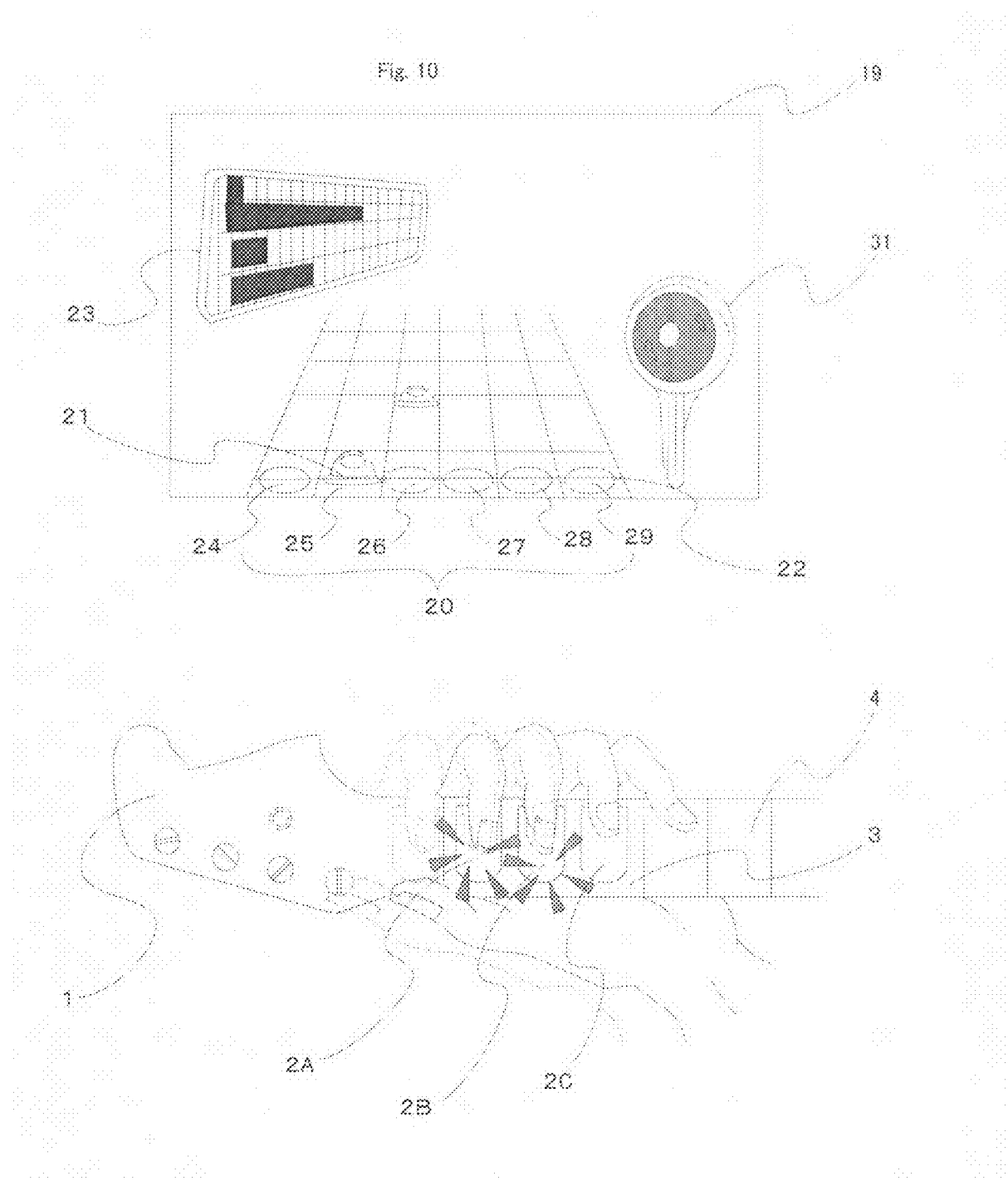

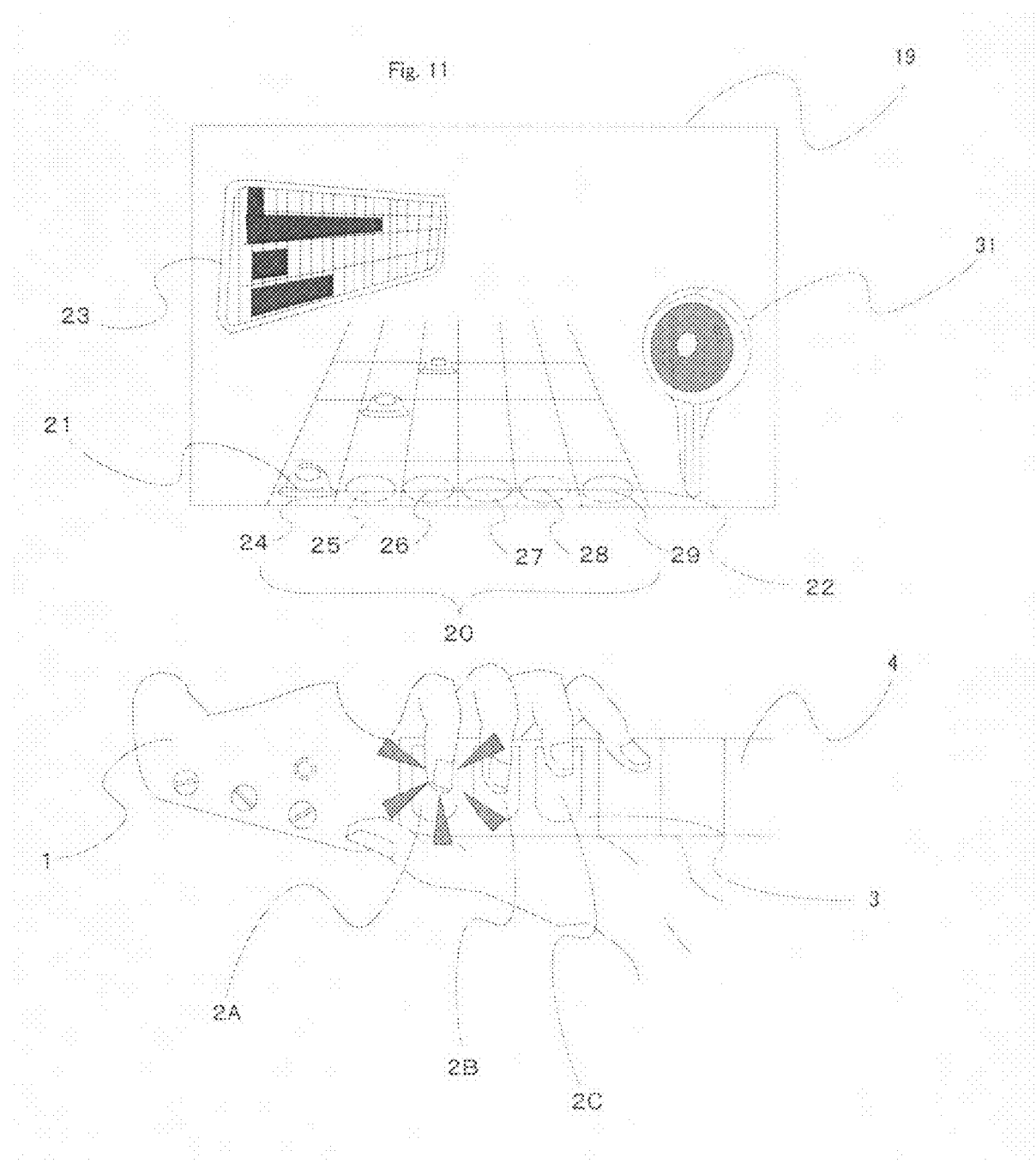

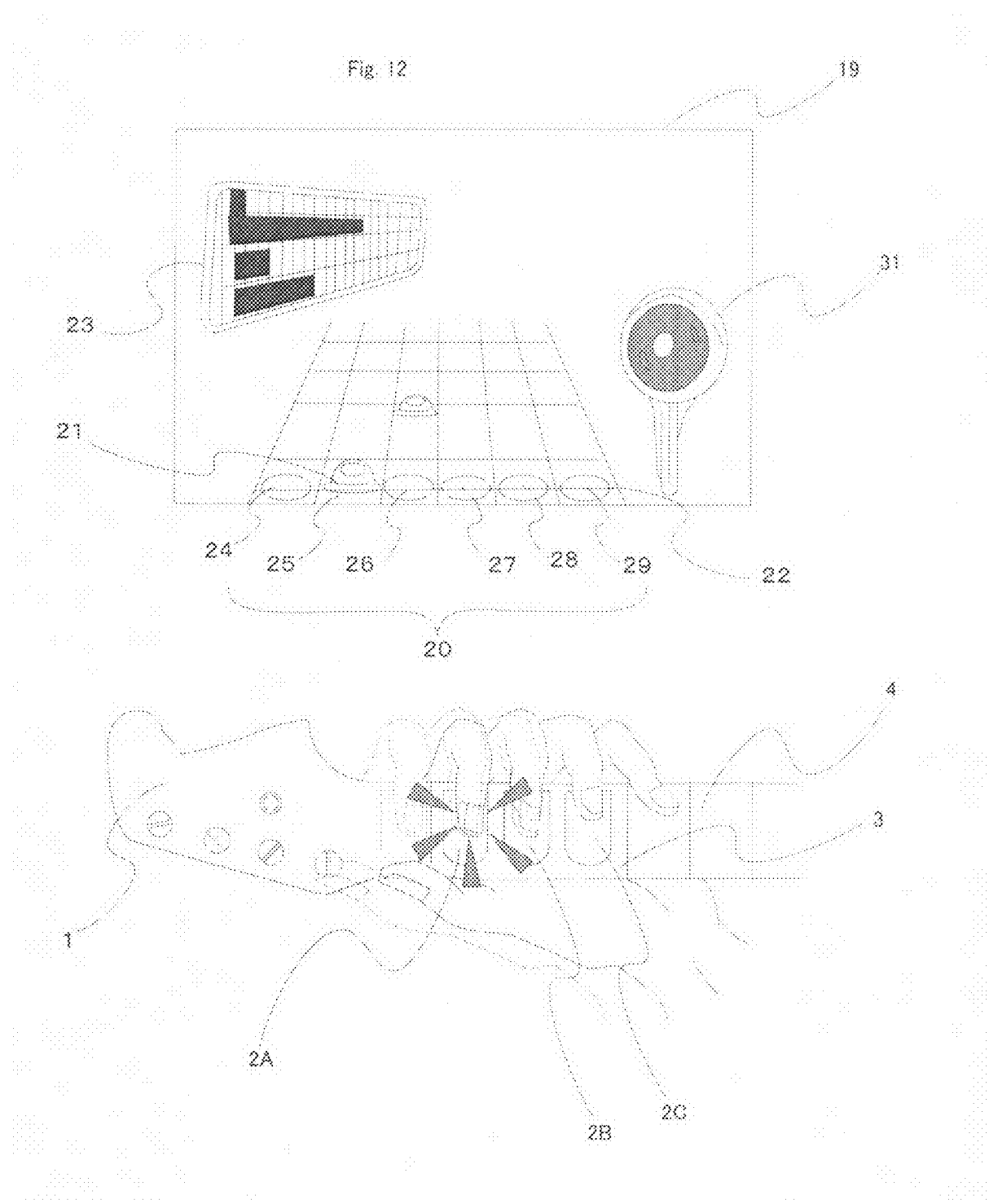

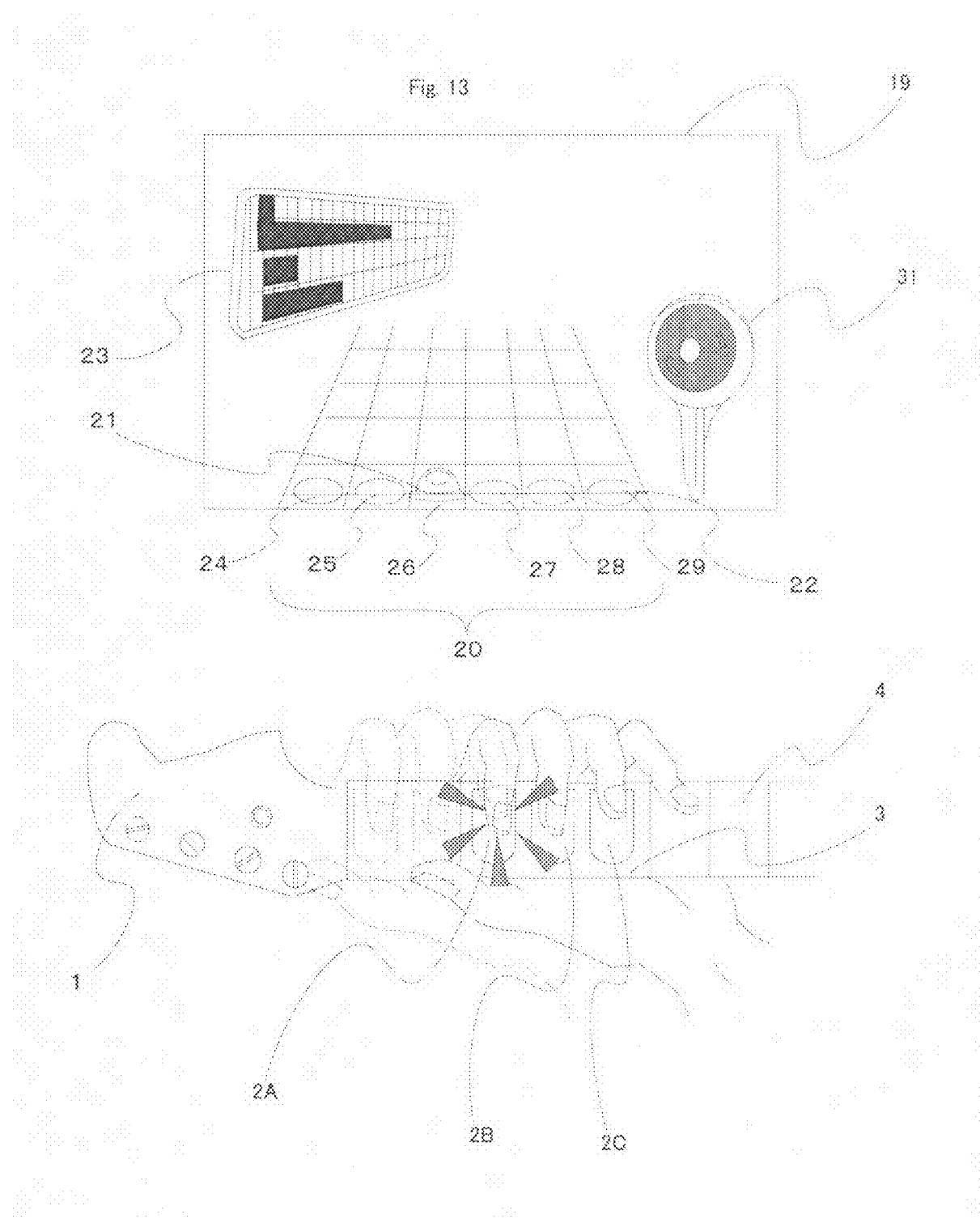

GAME INPUT DEVICE, GAME METHOD AND GAME SYSTEM USING THE SAME

TECHNICAL FIELD

The present invention relates to a game input device used for a music performance game where a player performs input operations along with a rhythm of music, and further a game method and a game system using such an input device.

BACKGROUND OF INVENTION

Conventionally, there is a game where an user inputs an input signal from a controller shaped as a music instrument while watching an operation instruction display corresponding to a rhythm, and evaluate the timing of the input.

For example, the Japanese Published Unexamined Patent Application No. 2001-293246 discloses a game device which enables one to enjoy a rhythm matching game with realistic instrument performance by using a mock guitar having a neck button to select at least one rhythm sound out of a plurality of rhythm sounds according to the flow of a music number, and a picking blade to confirm the output timing of selected rhythm sound.

Also, the Japanese Published Unexamined Patent Application No. 2001-013959 discloses a game input device in a guitar shape having a sliding operation input mechanism on the neck portion of the guitar However, when using the mock guitar described in the Japanese Published Unexamined Patent Application No. 2001-0293246, an input operation of a player at the neck portion of guitar is a mere button input. This does not allow a player to feel the change in performance depending on how to hold strings or moving between flames like an actual guitar, thus it lacks reality.

Also, the sliding operation input mechanism can slide on the neck portion of the guitar when playing a game using the guitar-shaped input device disclosed in the Japanese Published Unexamined Patent Application No. 2001-013959, however, the sliding operation input mechanism does not have a plurality of input buttons for the input operation. This does not allow a player to feel the change in performance depending on how to hold strings or move between flames like an actual guitar, thus it lacks reality.

Under these circumstances, development of a game input device that can provide an enjoyment of an aggressive feeling just like playing an actual instrument along with the rhythm of music has been sought.

BRIEF SUMMARY OF THE INVENTION

The present invention provides a game input device which is capable of expressing a high level of reality just like playing an actual instrument without impairing operatablity in a game where an user inputs a signal from a controller in a musical instrument shape by watching an operation instruction display according to a rhythm of music and evaluates the timing, and further a game method and a game system using such an input device.

That is, the present invention is a game input device which has a main body portion, a neck portion extending from the main body portion, and a moving portion movably attached to the neck portion, the moving portion including a plurality of signal input portions, wherein a controller located in the game input device outputs a positioning signal or a moving motion signal on the moving portion and an input signal on the signal input portion.

By this configuration, an user inputs an operation signal by combining a slide operation in one or two directions and a pressing operation of the plurality of signal input portions, thereby the input operation can be performed just like playing an actual music instrument, and also realizes numerous variations as a game and obtains high game characteristics. Also, unlike arranging signal input portions on each operation position of an actual instrument, the user can experience the feel of sliding while touching each signal input portion itself, thereby the structure is not going to be complicated and operatablity is not impaired.

Also, in the game input device according to the present invention, the moving portion may be slidably attached on the neck portion.

Further, in the game input device according to the present invention, the moving portion may be slidably attached on the neck portion while an input is depressed.

This configuration enables various input means that could not be experienced by a game using a conventional game input device, thereby it enables more aggressive operation.

And, in the game input device according to the present invention, the moving portion may be attached slidably in the direction perpendicular to the extension of the neck portion.

Also, the number of inputs for the game input device according to the present invention may be three.

Further, the number of inputs for the game inputs device according to the present invention may be four.

The game input device is held with the neck portion with one hand, and that hand performs a slide operation and input. Therefore, when the number of inputs is three or four, three or four fingers out of five perform input and the rest of fingers can support the neck portion and the moving portion thereby enabling a player to focus more on the input and the slide operation and to enjoy playing the game.

And, the number of inputs for the game input device according to the present invention may be five.

Also, the game input device according to the present invention may be in a shape of guitar.

Further, the present invention is a game method using a game input device which has a main body portion, a neck portion extending from the main body portion, and a moving portion movably attached to the neck portion and provided with a plurality of signal input portions, wherein a first positioning signal or a first moving motion signal and a first input signal on the signal input portion are output by the game input device, a player inputs a second positioning signal or a second moving motion signal, and a second input signal to the game input device according to an instruction displayed on a display screen, and the game input device evaluates both the first and second positioning signals, moving motion signals, and input signals.

By this configuration, a player can enjoy both the input operation and the sliding operation on the neck portion of the game input device, thereby the player can experience an aggressive feeling just like playing an actual instrument. Further, since both the input operation and the sliding operation can be performed on the neck portion, higher level techniques exist and players can complete their techniques.

And in the game method according to the present invention, the instruction displayed on the display screen may be an object moving on an object lane.

Also the number of object lanes may be five for the game method according to the present invention.

Further the number of inputs may be three or four for the game method according to the present invention.

When the number of object lanes is five and the number of inputs is three or four, the slide positions of the moving portion on the neck portion may be two or three, thereby the player's operation is not too complicated and enables players to complete their techniques.

Also, the number of object lanes may be six for the game method according to present invention.

Further the number of inputs may be three to five for the game method according to present invention.

When the number of object lanes is six and the number of inputs is three to five, the slide positions of the moving portion on the neck portion may be two to four, thereby the player's operation is not too complicated, and this enables players to complete techniques different from those described above.

Also in the game method according to present invention, the object lane is displayed on a display screen, the display screen has a first input region which is an object lane that can be selected with an input before moving and a second input region adjacent to the first input region, and the moving portion may be arranged across the first input region and the second input region to receive inputs.

Further, the present invention is a game system having a controller and a platform, the controller has an moving portion and a neck portion, the input means has at least two or more inputs, the moving portion is provided onto the neck portion, and the position of the moving portion is movable on the neck portion, the platform has an input data evaluation portion, and a memory containing game result judgment data. The controller and the input data evaluation portion are connected through input/output terminal. The controller obtains an operation data input by a player, the operation data is then transmitted to the input data evaluation portion through the input/output terminal, the input data evaluation portion receives the game result judgment data, and compares the operation data and the game result judgment data based on judgment parameters including the timing of input operation and the sliding distance of the moving portion, thereby evaluating a player's input operation.

By this configuration, a user inputs an operation signal by combining a slide operation in one or two directions and a pressing operation of the plurality of signal input portions, thereby the input operation can be performed just like playing an actual music instrument, and also enables numerous variations as a game and obtains high game characteristics. Also, unlike arranging signal input portions on each operation position of an actual instrument, the user can experience the feel of sliding while touching each signal input portion itself, thereby the structure is not going to be complicated and operatablity is not impaired. In addition, not only the consistency of timing, the configuration enables various evaluations, such as deviation of slide operation positions and mistakes in pressing inputs, thereby evaluation at a high level can be made.

And, in the game system according to the present invention, the controller and platform may be integrated. Also, the game system according to the present invention further consists of a display, the display and memory are connected through an input/output terminal, and game execution data may be transmitted from the memory to the display.

Further, in the game system according to the present invention, the number of object lanes may be larger than the number of inputs by one when the object lane is displayed on the display screen of said display.

Still further, a judgment parameter of a game system according to the present invention may include continuity of a player's appropriate input operation.

Because the system includes such a judgment parameter, a player can further enjoy the game and able to set a goal to improve his or her own technique.

Further, in the game system according to the present invention, the judgment element may include the consistency of the color of input for the input operation and the color of a selected object when an object lane and an object are displayed on the display screen of said display.

Because the system includes such a judgment parameter, a player can further enjoy the game and able to set a goal to improve his or her own technique.

BRIEF DESCRIPTION OF THE DRAWINGS

FIG. 9 shows an embodiment of a game according to the present invention;

FIG. 10 shows another embodiment of a game according to the present invention;

FIG. 11 shows yet another embodiment of a game according to the present invention;

FIG. 12 shows a further embodiment of a game according to the present invention; and FIG. 13 shows another embodiment of a game according to the present invention.

DETAILED DESCRIPTION OF INVENTION

Embodiments according to the present invention will hereinafter be explained in detail. In addition, configurations of the present invention are explained below, however, these are specific examples to show only a portion of the present invention and the present invention is not limited to these.

Figure 1:
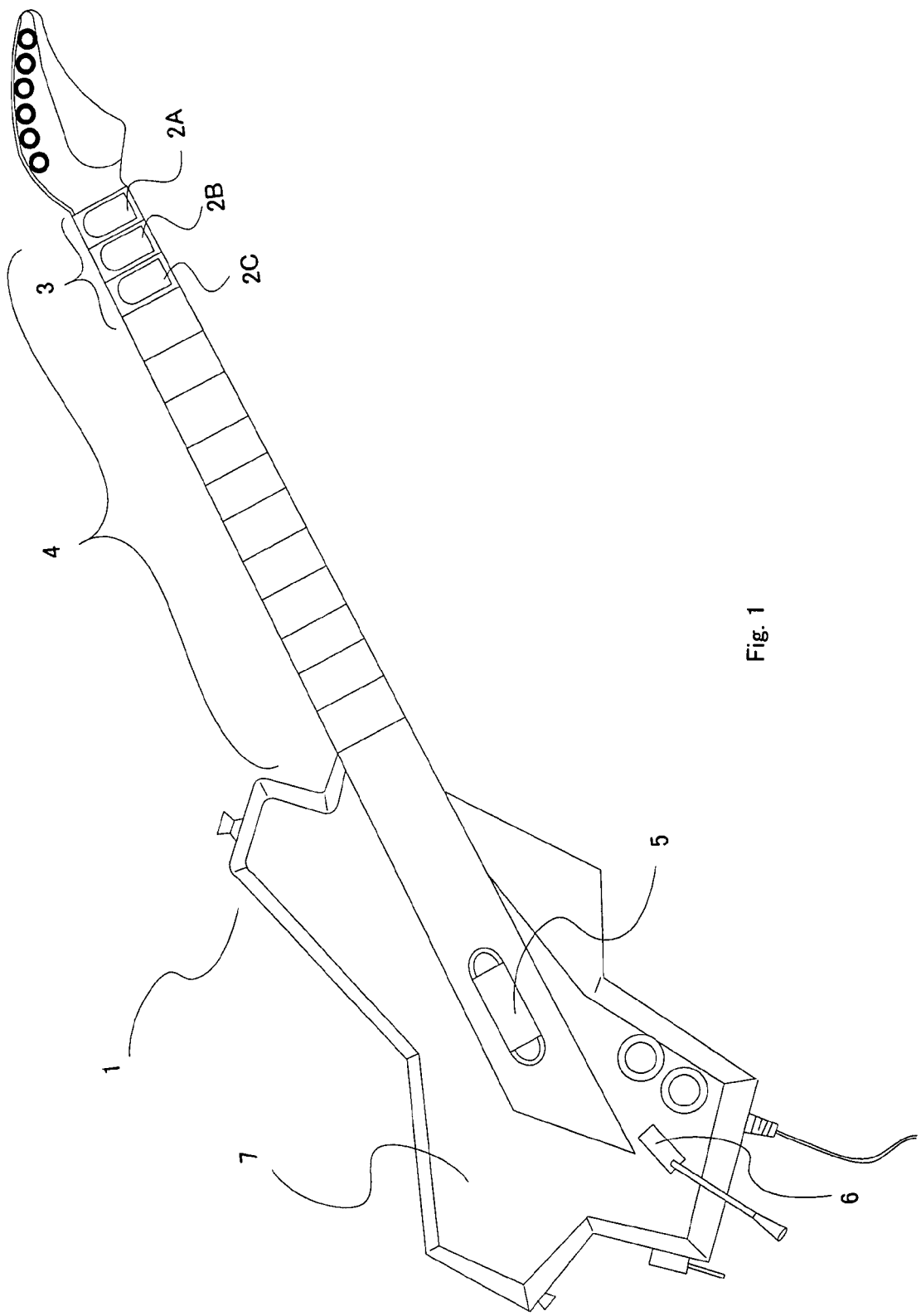
FIG. 1 shows an example of a game input device in a guitar shape according to present invention.

FIG. 1 is a configuration diagram illustrating an example of a guitar-shaped game input device according to the present invention (hereinafter referred as a mock guitar 1).

The mock guitar 1 consists of a neck portion 4 and a main body portion 7. A moving portion 3 is provided to the neck portion 4. A first signal input 2A, a second signal input 2B, and a third signal input 2C are provided to the moving portion 3. Also the main body portion 7 has a timing input means 5 and a rotary switch 6.

The first signal input 2A, the second signal input 2B, and the third signal input 2C are attached on the moving portion 3 to select an object according to an instruction of a game console. The moving portion 3 is slidably attached on the neck 4 to enable the first signal input 2A, the second signal input 2B, and the third signal input 2C to move on the neck portion 4.

The timing input means 5 is attached on the center of body portion to confirm an input of selection after selecting an object with the input. The rotary switch 6 is arranged below the timing input means 5 to switch to additional modes, such as a echo mode (same types of sound staggered and outputted) or a chorus mode (different types of sound output simultaneously).

Means to confirm an input of selection after selecting an object with an input is not limited to the timing input means 5. For example, the first signal input 2A, the second signal input 2B, and the third signal input 2C may be used as a means for confirming an input of selection, and any other means may be also used.

Also, the number of input is not limited to three, as long as there are two or more. Preferably, there may be three, four, or five inputs. A player holds the body portion of the mock guitar 1 with one hand while supporting the neck portion 4 of the mock guitar 1 with the other hand and operates the mock guitar 1. Therefore, the number of fingers that can operate the inputs provided to the moving portion 3 is normally three or four. Based on this standpoint, three or four are the most preferable number of inputs.

Further, the mock guitar 1 may be provided with components not described above. The mock guitar 1 may be provided with, for example, a speaker, a vibratory device, a band for positioning the guitar 1 closer to a player's body, or a start button and a select button to proceed with a game.

Normally, the first signal input 2A, the second signal input 2B, the third signal input 2C, and the moving portion 3 provided to the neck portion 4 of mock guitar 1 correspond to a input means for a left hand. Meanwhile, the timing input means 5 and the rotary switch 6 provided to the main body portion 7 of mock guitar 1 correspond to an input mean for a right hand. However, in the mock guitar 1, these input means for a right hand and left hand may be opposite. That is, the means normally used for a left hand may be used as an input means for a right hand, also the means normally used for a right hand may be used as input means for a left hand.

Also, the game input device according to the present invention is not limited to a guitar shape. The game input device according to the present invention may be, for example, in a shape of a ukulele.

Figure 2:
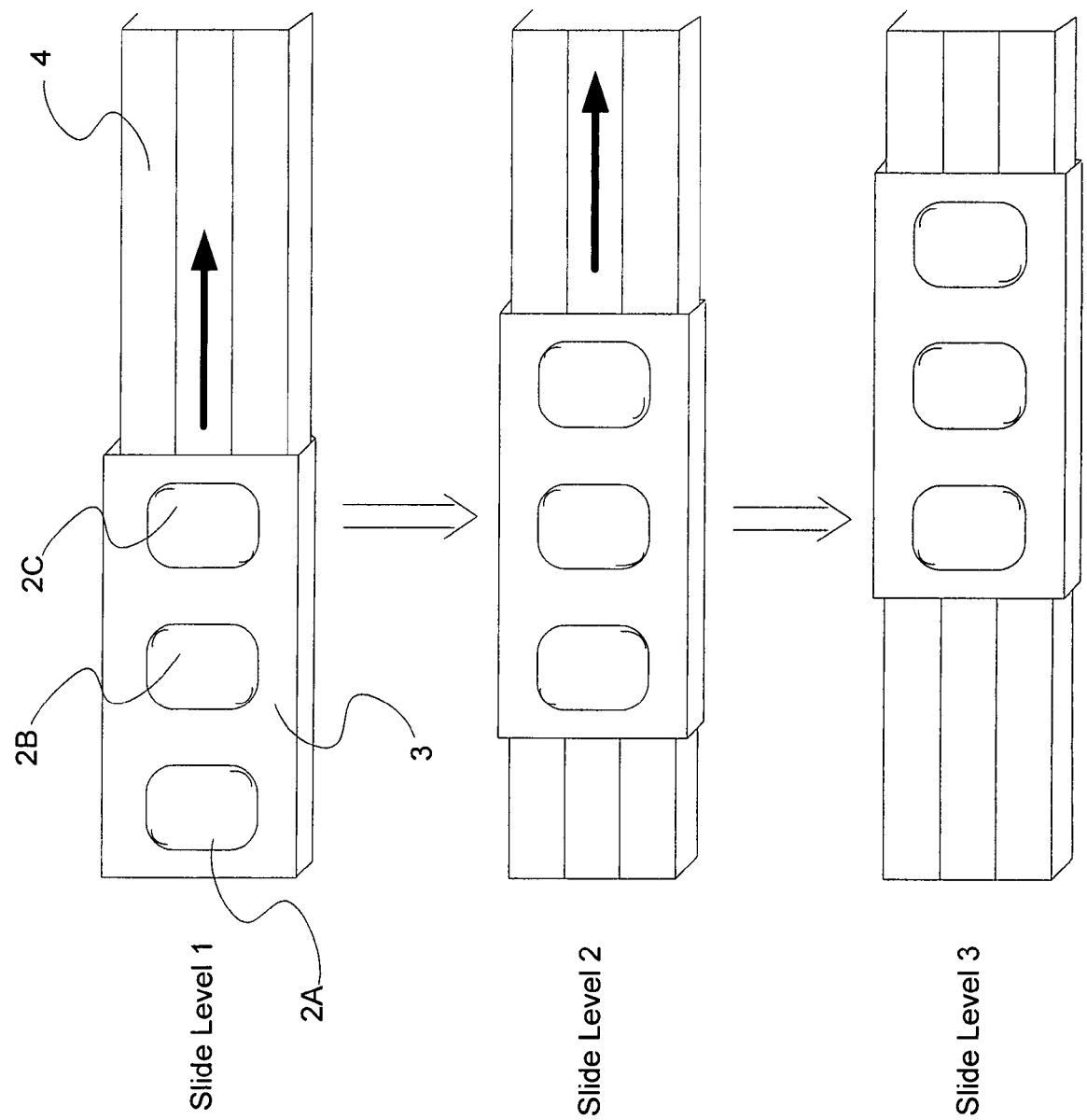
FIG. 2 is an enlarged view of a neck portion of the mock guitar in FIG. 1.

FIG. 2 is an enlarged view of the neck portion 4 of the mock guitar 1. The neck portion 4 is provided with a moving portion 3. Also, a first signal input 2A, a second signal input 2B and a third signal input 2C are provided to the moving portion 3.

The moving portion 3 is slidably attached on the neck portion 4. The moving portion 3 is able to move to a slide level 1 position, a slide level 2 position, or a slide level 3 position.

The slide level 1 position is a position on the neck portion 4 and the farthest away from the main body portion 7 (hereinafter referred as the left end of neck portion 4). The slide level 2 position is a position sliding one level from the left end of neck portion (hereinafter referred as the center of neck portion 4). The slide level 3 position is a position sliding two levels to the main body portion 7 from the left end of neck portion (hereinafter referred as the right end of neck portion 4).

Also, the moving portion 3 located on the slide level 1 position can be moved to the slide level 3 position without stopping at the slide level 2 position. Also, it is possible to perform the opposite operation.

The moving portion 3 can move to any position on the neck portion 4 and is not limited to the slide level 1 position, the slide level 2 position, or the slide level 3 position. For example, the moving portion 3 can also move to a slide level 4 position (not shown), that is, a position sliding three levels to the main body portion 7 from the left end of neck portion (hereinafter referred as the extreme right end of neck portion 4).

The moving portion 3 may be movably attached on the neck portion 4. For example, the moving portion 3 may slide on the fixed neck portion 4. Alternatively, the neck portion 4 may slide on the fixed moving portion 3. In such case, the neck portion 4 may be attached so as to slide parallel to the arrangement of signal input portions provided to the moving portion 3. Also, the neck portion 4 may be attached slidably to the moving portion 3 perpendicular to the direction which the neck portion 4 extends.

Also the moving portion 3 may be slidably attached on the neck portion 4 while the first signal input 2A, the second signal input 2B or the third signal input 2C is depressed.

Figure 3:
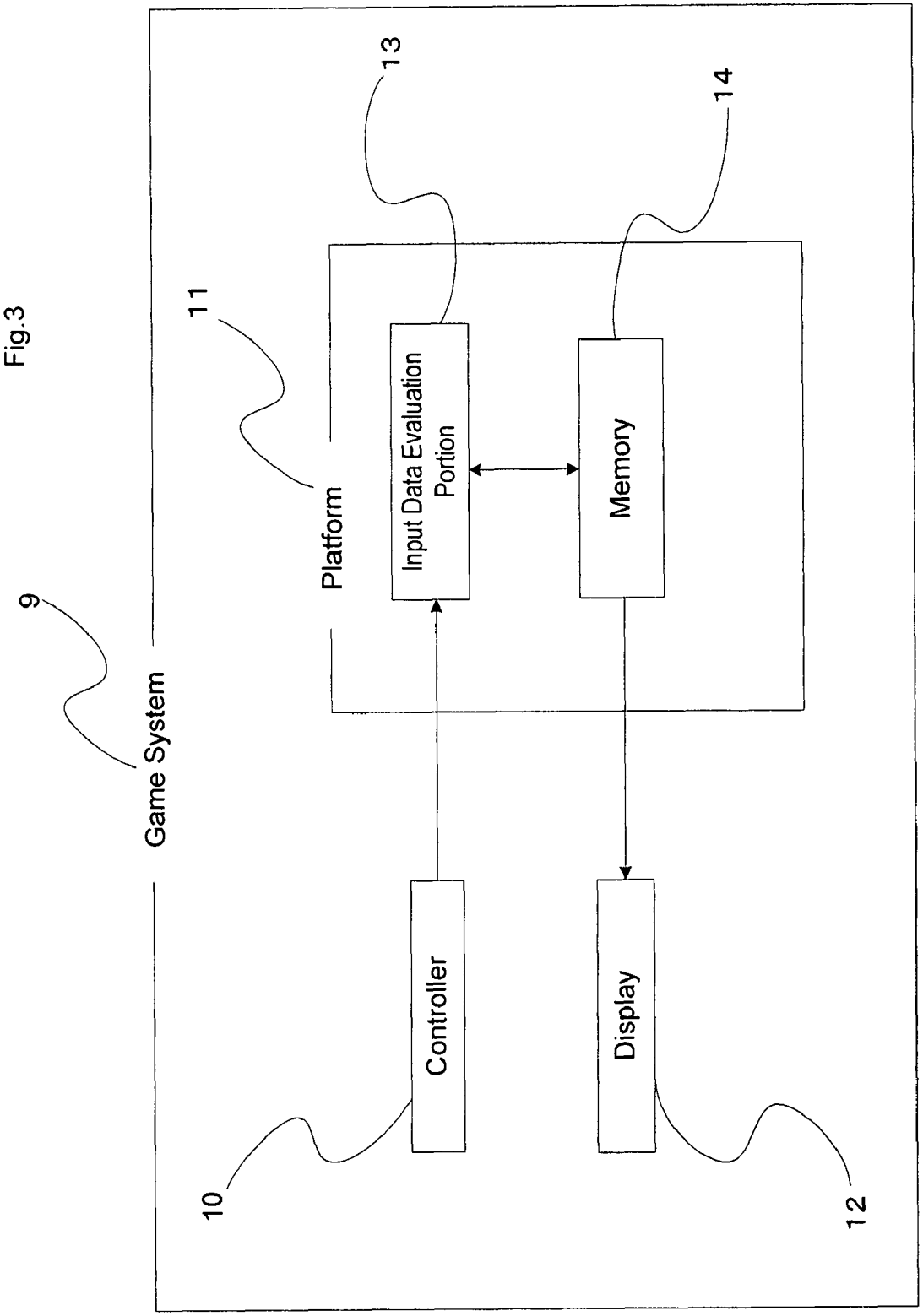
FIG. 3 shows an overview of a game system according to the present invention.

FIG. 3 shows an outline of game system 9 according to the present invention. The game system 9 according to the present invention is provided with a controller 10, platform 11, and a display 12.

The controller 10 is, for example, having a configuration similar to that of the mock guitar 1 described above. The platform 11 is provided with an input data evaluation portion 13 and a memory 14. The memory 14 contains game result judgment data and game execution data. The display 12 has a display screen.

The game result judgment data is data to determine whether a player's input operation is appropriately performed according to the instructions of the game machine. The game result judgment data includes, for example, (1) data indicating a timing of a player's input operation relative to an object, (2) data indicating the shortest distance that should be taken for a player's slide operation relative to an object, (3) data to indicate a color that should be input by a player according to an object, (4) a normal sliding operation for a player to input an object. The game execution data is the data to conduct a game from the beginning to the end.

The controller 10 and the input data evaluation portion 13 are connected through the input/output terminal. Through this input/output terminal, the operation data input to the controller 10 is transmitted to the input data evaluation portion 13.

The input data evaluation portion 13 receives the game result judgment data from the memory 14, as well as receives the operation data from the controller 10. The input data evaluation portion 13 compares the operation data and the game result judgment data based on judgment parameters, and evaluates the input operation of a player. The judgment parameters include timing of input operation, slide distance of the moving portion, consistency of the color of input and the color of a selected object, continuity of a player's appropriate input operation, and a difficulty of a slide operation. However, the judgment parameters are not limited to this.

Comparison and evaluation of timing for input operations are performed as follows: First, compare the timing of an input operation contained in the operation data and above (1) timing of a player's input operation relative to an object contained in the game result judgment data. The closer the timing of both, the player receives a higher evaluation.

Comparison and evaluation for the sliding distance of the input moving device are performed as follows. First, compare the sliding distance of the moving portion contained in operation data and above (2) the shortest distance should be taken for a player's sliding operation relative to an object contained in the game result judgment data. When the sliding distance is longer than the minimum distance for the sliding operation, the player receives a high evaluation.

Comparison and evaluation for consistency of the color of input and the color of a selected object are performed as follows. Compare the color of an input contained in the operation data and above (3) the color that should be input by a player according to an object contained in the game result judgment data. When both are matched, a high evaluation is provided, when not matched, a low evaluation is provided.

Evaluation for the continuity of a player's appropriate input operation is performed by determining how many input operations are determined to be appropriate based on the above comparison and evaluation, are performed in a row. When the degree of continuity is high, the player obtains a high evaluation, and when the degree of continuity is low, the player obtains a low evaluation.

Comparison of a sliding operation for the moving portion and evaluation of its difficulty are performed as follows. First, compare input sliding data contained in the operation data and above (4) normal sliding operation for a player to input an object contained in the game result judgment data.

When an input sliding operation is determined to be difficult to perform compared to the normal sliding operation, a high evaluation is given to a player. When both operations are the same, no specific evaluation is given. When an input sliding operation is determined to be easy to perform compared to the normal sliding operation, a low evaluation is given to the player. Judgment of difficulty for this sliding operation is hereinafter explained in detail referring to the embodiments described in FIGS. 9 to 13 below.

Also, the display 12 and the memory 14 are connected through an input/output terminal. Through this input/output terminal, the game execution data stored in the memory 14 is transmitted to the display 12.

As a display 12, for example, a liquid display device and a plasma display device can be considered but not limited to this.

Also, in the game system according to the prevent invention, a controller 10 or a display 12 may be provided to the platform 11 and these may be integrated.

Figure 4:
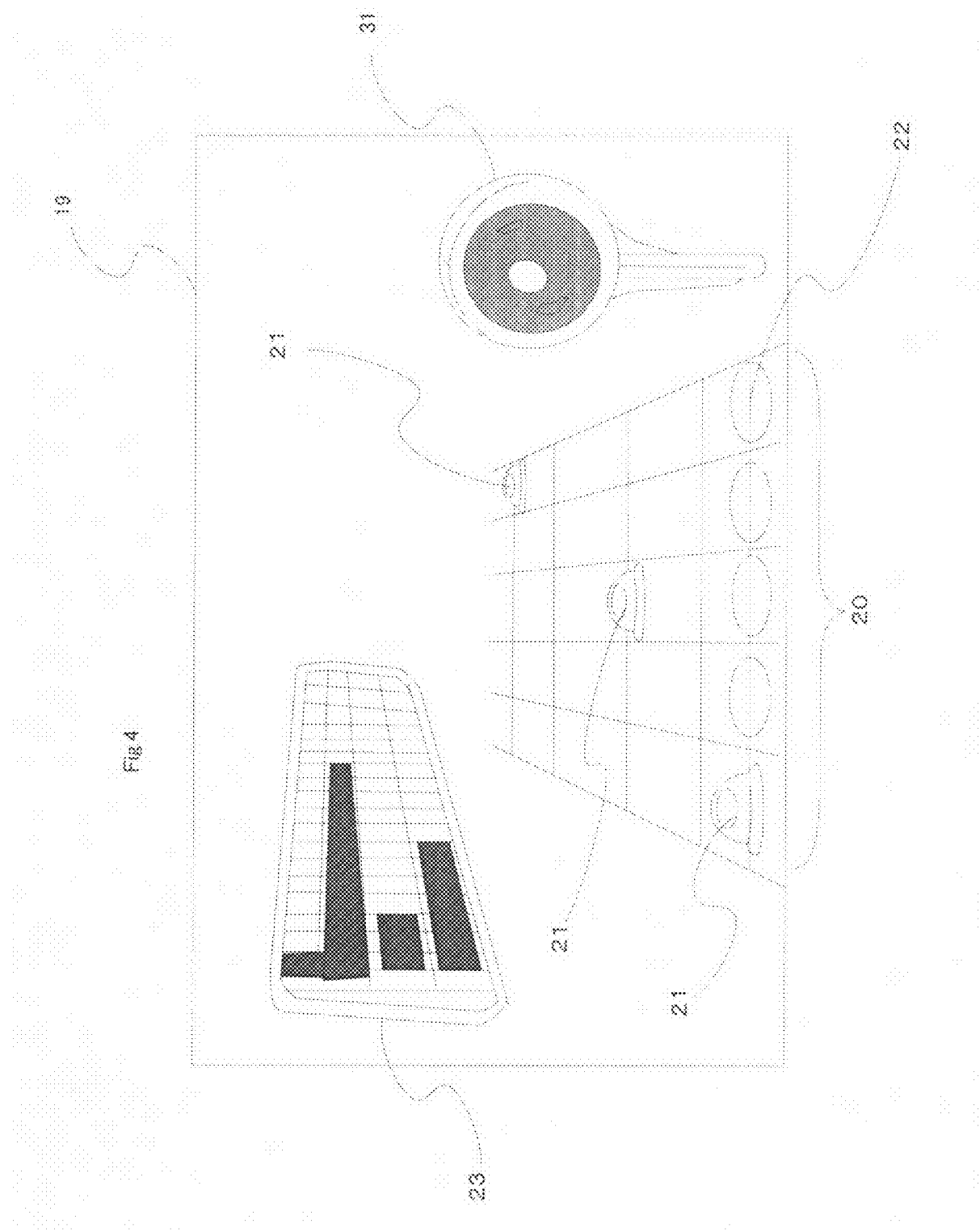
FIG. 4 is an example of a display screen provided to a display on the game system according to present invention.

FIG. 4 shows an example of a display screen 19 provided to the display 12 of the game system according to the present invention.

The display screen 19 has an object lane 20, a lateral bar graph 23, and a presentation display 31. The object lane 20 has object buttons 21 move downward on the object lane, and an input guide line 22.

The object buttons 21 are to instruct input operations to a player. The object lane 20 is to indicate a route of an object button 21 moving from the upper end to the lower end of the object lane. When the object button 21 moves downward and reaches the input guide line 22 on the object lane 20 is when the timing occurs. In this case, the object button only moves downward, and does not move, for example, sideways or upward.

The number of lanes for the object lane 20 is not limited to a specific number and may be any number. However, the number of object lanes is preferably five or six due to the standpoint of experiencing the game aggressively, such as by completing the game techniques. Further, the number of object buttons 21 moving on the object lane 20 is not limited to a specific number and may be any number.

Also, the lateral bar graph 23 indicates a game score and an amount of gage. The game score is the points obtained by a player as a result of game play. The amount of gage is a parameter to continue the game and is the parameter that disables continuation of the game when it is lost. The presentation display 31 is to display a player's game.

The display screen according to the present invention may be different from the screen described above as long as it instructs input operations to a player. For example, the object button 21 may be in other shapes (such as a star shape, a triangle shape, or a square shape) instead of a button shape. Also, the direction of the object button 21 moving on the object lane 20 may be sideways or a diagonal direction. Also, the display screen 19 may be without the object lane 20 thereby an object instructing a player for an input operation suddenly appears on the display screen.

The lateral bar graph 23 may indicate more information other than a player's game score or a gage amount. For example, the lateral bar graph 23 may indicate a player's personal data. Also, for example, a game score or a gage amount for an opponent playing against via a network may be indicated. The presentation display 31 may display any presentation, for example, fire-work like shapes may be displayed simultaneously with the player's input operation.

Figure 5:
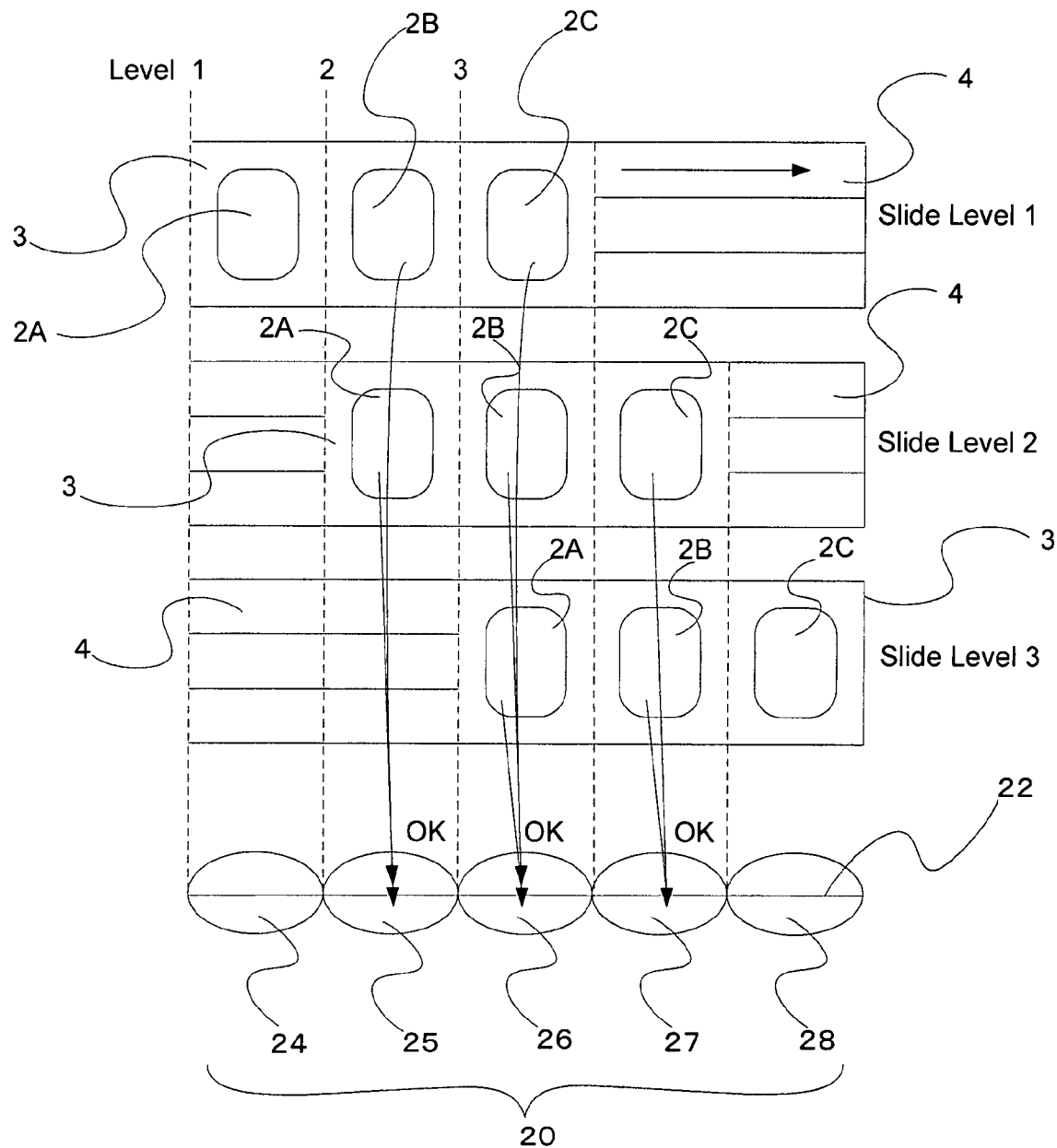
FIG. 5 shows an example of sliding and an example of input operation for a moving portion of the mock guitar described in FIG. 1.

FIG. 5 is a diagram showing an object lane 20 existing on the display screen 19. Also FIG. 5 shows object buttons 21 on the display screen, which may be selected by the input on each slide level of the mock guitar 1 above.

In FIG. 5, the neck portion 4 shows a neck portion provided to the mock guitar 1 above. A moving portion 3 is attached to the neck portion 4. The moving portion 3 has a first signal input 2A, a second signal input 2B and a third signal input 2C. Slide levels 1, 2, and 3 are the same as explained in FIG. 2 above.

Also in FIG. 5, a first object lane 24, a second object lane 25, a third object lane 26, a fourth object lane 27, and a fifth object lane 28 indicate each lane in the object lane 20 of the display screen 19 above. The object lane has the input guide line 22 as explained in FIG. 4 above.

FIG. 5 shows a case of five object lanes 20 and three inputs. As shown in this figure, when the position of the moving portion 3 is on the slide level 1, the first object lane 24 to the third object lane 26 may be selected by the input. That is, the first signal input 2A can select the first object lane 24. Also, the second signal input 2B can select the second object lane 25. Further, the third signal input 2C can select the third object lane 26.

Also, when the position of the moving portion 3 is on the slide level 2, the second object lane 25 to the forth object lane 27 may be selected by the input. That is, the first signal input 2A can select the second object lane 25. Also, the second signal input 2B can select the third object lane 26. Further, the third signal input 2C can select the fourth object lane 27.

Further, when the position of the moving portion 3 is on the slide level 3, the third object lane 26 to the fifth object lane 28 may be selected by the input. That is, the first signal input 2A can select the third object lane 26. Also, the second signal input 2B can select the fourth object lane 27. Further, the third signal input 2C can select the fifth object lane 28.

As apparent from above, the selection of the first object lane 24 can be made in one way. And, the selection of the second object lane 25 can be made in two ways. Also, the selection of the third object lane 26 can be made in three ways. Further, the selection of the fourth object lane 27 can be made in two ways. Still further, the selection of the fifth object lane 28 can be made in one way.

As described above, the moving portion 3 provided with inputs is arranged across the object lane and can be selected by the inputs before moving (In this case, this means the first object lane 24 to the third object lane 26. Hereinafter referred as a first input region) and the region adjacent to the first input region (In this case, this means the fourth object lane and the fifth object lane. Hereinafter referred as a second input region), and is able to receive input.

Figure 6:
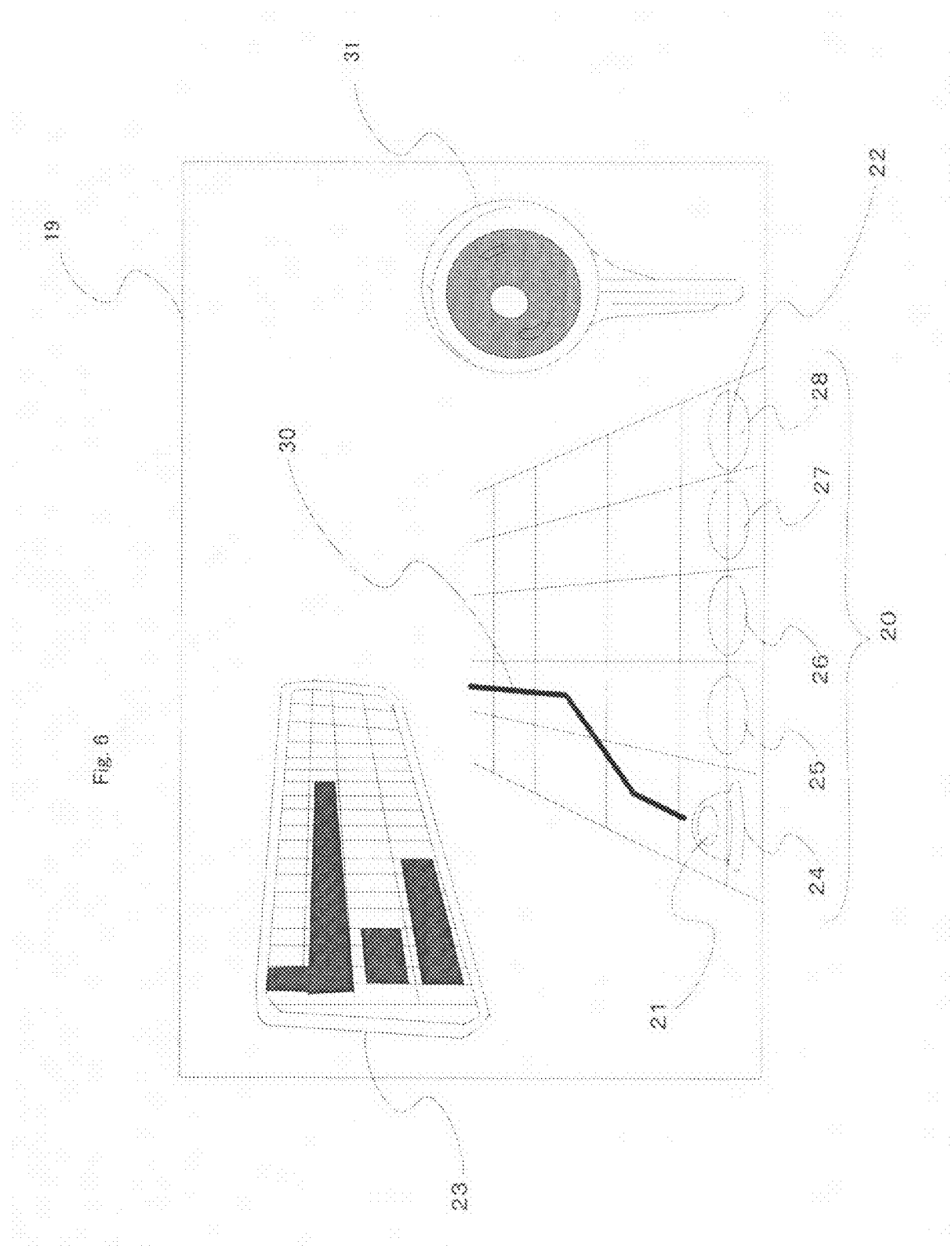
FIG. 6 shows an example of an object button moving on an object lane of the display screen.

FIG. 6 shows an object lane 20 existing on the display screen 19. Also FIG. 6 shows a display screen that has object buttons 21 existing on the object lane in a linear form (hereinafter referred as a linear form object button 30).

In FIG. 6, the display screen 19 has an object lane 20, a lateral bar graph 23 and a presentation display 31 as explained in FIG. 4. The object lane 20 has a first object lane 24, a second object lane 25, a third object lane 26, a fourth object lane 27, a fifth object lane 28, and an input guide line 22. Further, there is a linear shaped object button 30 which moves downward on the object lane and is straddled between the first object lane 24 and the second object lane 25. The linear shaped object button 30 is also an input instruction to a player.

The method for player's input operation according to the input instruction of linear shaped object button 30 is hereinafter explained. First is to move the position of above moving portion 3 on the mock guitar 1 to above slide level 1. And select the first signal input 2A above provided on the moving portion 3. While selecting the first signal input 2A, perform selection confirmation input with the timing input means 5 when the lower end of linear shaped object button 30 reaches the input guide line 22.

By continuing the selection confirmation input and the selection of first signal input 2A, the length of the linear shaped object button 30 gradually shortens. As the player moves the position of the moving portion 3 from above slide level 1 to above slide level 2 when the linear shaped object button 30 is shortened to the position moved from the first object lane 24 to the second object lane 25. This operation is performed while continuing with the selection confirmation input and the selection of first signal input 2A.

The player continues with the selection confirmation input and the selection of the first signal input 2A until all the linear shaped object button 30 has disappeared at the end. By operating this way, the linear shaped object button 30 can be input.

Further, the linear shaped object button 30 may straddle from the first object lane 24 to the second object lane 25 existing on the display screen 19. A linear shaped object button 30 may straddle from any lane of object lane 20 to any other existing lane.

For example, a linear shaped object button 30 may straddle from the third object lane 26 to the fifth object lane 28. The input operation to this linear shaped object button 30 is the same as above, except that the first signal input 2A replaces the third signal input 2C.

Figure 7:
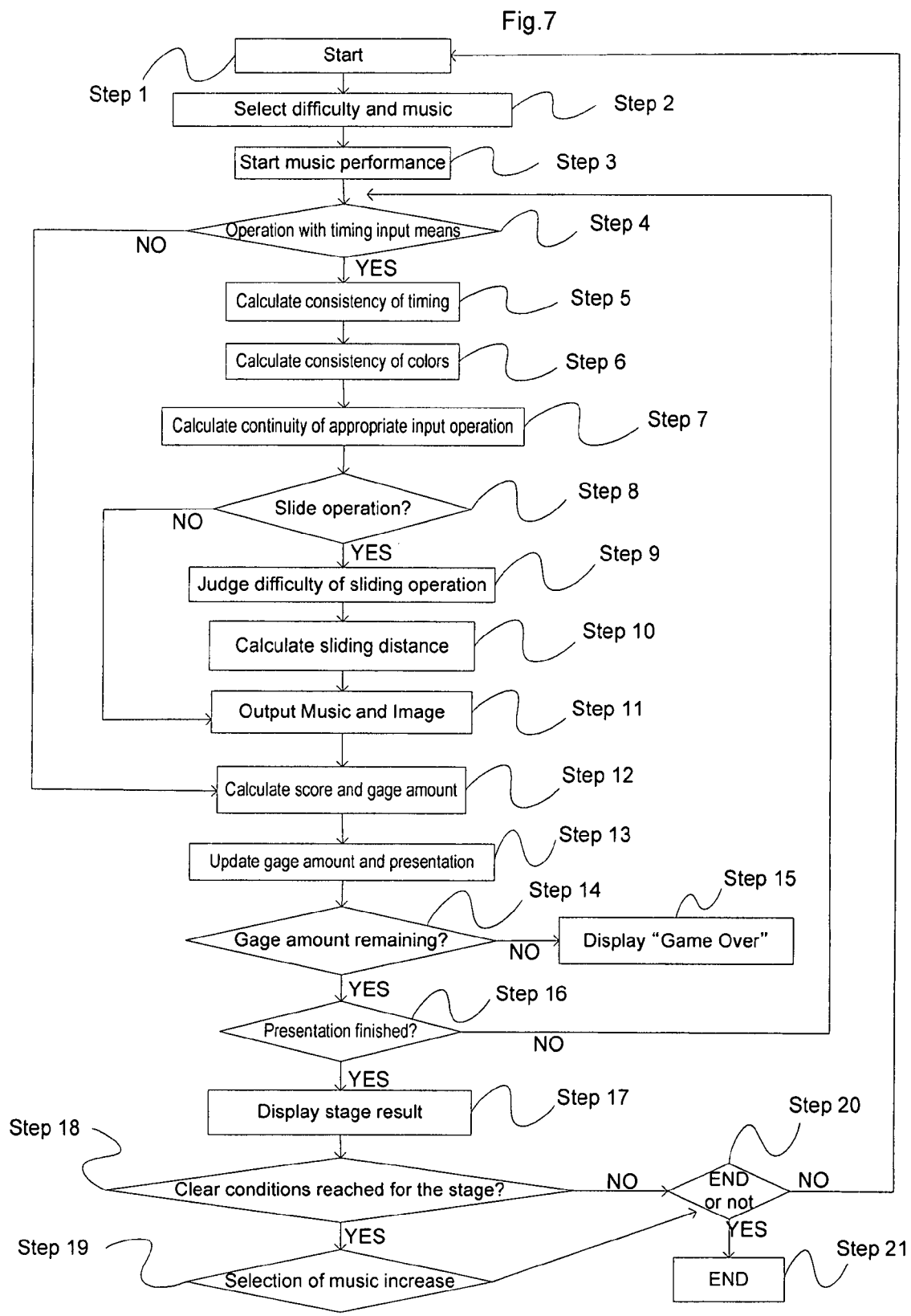
FIG. 7 is a flow chart showing a game configuration according to the present invention.

FIG. 7 is a flow chart showing a game configuration according to the present invention. The game configuration according to present invention is hereinafter explained in detail referring to FIG. 7. In addition, the present invention is not limited to the flowchart below.

First, game execution data is output to the display 12 from the memory 14, game information is displayed on the display screen 19 of the display 12, and a musical performance game is begun (step 1).

The player selects a specific difficulty level and a music number from alternatives of game difficulty and music numbers displayed on the display screen 19 when the game is begun (step 2).

Selections of difficulty levels are displayed on the display screen 19, for example, choose one play level from three levels, such as advanced (expert), intermediate (normal), beginner (practice). Also, selection of music number is to choose one song from multiple selections of music numbers displayed on the display screen. After these selections, the musical performance game is started (step 3).

When the musical performance game is begun, a plurality of object lanes 20 are displayed on the display screen 19 and a plurality of object buttons 21 move on each lane over time.

The player uses a game input device (such as the mock guitar 1) or the controller 10 for input operations according to the object buttons 21. The input operations select the object button 21 by an input when the object buttons 21 moving on the object lane 20 reach the input guide line 22 and to confirm the selection by the timing input means 5 while selected.

When a player's input operation is performed as above, the game input device (such as the mock guitar 1) or the controller 10 obtains input operation data, and the operation data is transmitted to the input data evaluation portion 13 through the input/output terminal.

The input data evaluation portion 13 receives game result judgment data from the memory 14 and calculates the game score and the gage amount by comparing the operation data and the game result judgment data (step 12).

The game score and the gage amount are calculated as follows. First is to judge whether there was a input operation by the timing input means 5 according to the object button 21 displayed on the display screen 19 (step 4). When there was no input operation, the game score and the gage amount are calculated (step 12).

When there is an input operation by the timing input means 5, the degree of consistency for the timing of input by the timing input means 5 and the input timing of timing input means 5 contained in the game result judgment data is calculated (step 5). When the timings for both agree completely, the player receives maximum score and maximum gage amount.

Also, when the player input was slightly deviated from the input timing of timing input means 5 contained in the game result judgment data, the smaller the deviation, the player can obtain a high game score and gage amount. When the deviation is large and exceeding a certain value contained in the game result judgment data, the player can not obtain the game score and the gage amount is decreased.

Further, when there was input operation by the timing input means 5, judgment is made whether the color of selected input and the color of object button 21 were matched or not (step 6). Each object has a color such as red blue or green, and each object lane has the same color as each object. Further, each input also has a color like red, blue, or green respectively.

When the color of the selected input and the color of the selected object are matched, the player receives a high score and a high gage amount. On the other hand, when they are not matched, the player can not obtain a score and the gage amount is decreased.

Further, when there was an input operation by the timing input means 5, the continuity of an appropriate input operation is calculated (step 7). That is, a calculation of how many of the above input operations determined to be appropriate based on the game result judgment data is performed. The longer the continued appropriate input operations, the player obtains a high score and a high gage amount.

Next is to judge whether the position of moving portion 3 has slid or not (Step 8). When it was not slid, music and image are output after steps 4 to 7 above (step 11), and the game score and the gage amount are calculated (step 12).

When the position of moving portion 3 is slid, calculation for the difficulty of the sliding operation will be performed (step 9). When the difficulty is high, the player receives a high score and a high gage amount.

When the position of the moving portion 3 is slid, calculation for the distance of the sliding for the moving portion 3 will be performed (step 10). When the distance is longer, the player receives a high score and a high gage amount.

When a player's input operation is judged as above, sound and image are output according to the result (step 11), and the game score and the gage amount are calculated (step 12).

When the game score and the gage amount are calculated as above, the game score and the gage amount are updated based on the calculation result (step 13). That is, the game score and the gage amount calculated in the input data evaluation portion 13 are transmitted to the memory 14, added to the game score and the gage amount cumulated in the memory 14, and stored in the memory 14. Stored game score and gage amount are transmitted to the display 12 and displayed in the lateral bar graph 23 located on upper left on the display screen 19 of the display 12.

And, the memory 14 determines the updated gage amount (step 14), and displays "Game Over" on the screen of display 12 when there is no gage amount (step 15).

When a gage amount still remains, the memory 14 determines whether the presentation is finished, and returns to the step 3 to perform the series of process (step 3 to 14) according to the object output next when the presentation is determined to be not finished (step 16). This process is repeated until the end of the presentation is detected. When the memory 14 determines the end of the presentation, the musical performance is evaluated based on the calculation result of score, and the stage result is displayed on the screen of display 12 (step 17).

Thereafter, the memory 14 determines whether a certain clear condition is reached at the completed stage (for example, score reached 100 points or more), and the number of music number can be selected for the next game will be increased when the clear condition has reached (step 19). When the condition is not reached, the player chooses whether to continue the game or not (step 20). When the player chooses to continue, return to step 1 and the series of actions described above is repeated. When the player chooses not to continue, the game will be finished (step 21).

And, when the number of music can be selected in the game is increased (step 19), the player also chooses whether to continue the game (step 20). When the player chooses to continue, return to the step 1 and repeat the series of actions with an increased number of music number. When the player chooses not to continue, the game will be finished (step 21).

Figure 8:
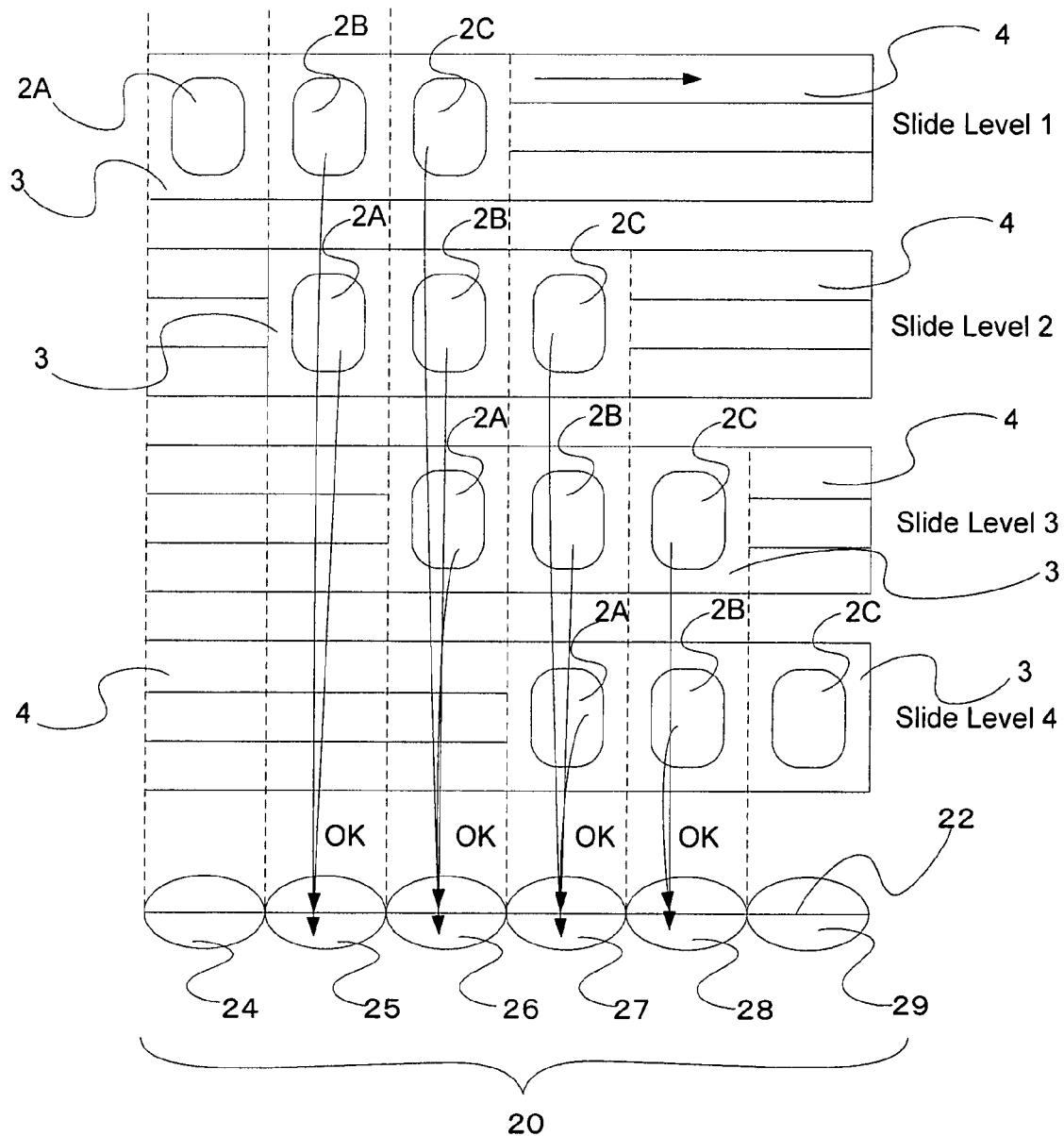
FIG. 8 shows an example of sliding and an example of an input operation for a moving portion of a mock guitar described in FIG. 1.

FIG. 8 shows an object lane 20 existing on the display screen 19. The FIG. 8 also shows an object button 21 on the display screen which can be selected by the input on each slide level of the mock guitar 1 above.

In FIG. 8, the neck portion 4 describes a neck portion provided to the mock guitar 1 above. A moving portion 3 is attached to the neck portion 4. The moving portion 3 has a first signal input 2A, a second signal input 2B and a third signal input 2C. The slide levels 1, 2, 3, and 4 are the same as those explained above.

Also in FIG. 8, the first object lane 24, the second object lane 25, the third object lane 26, the forth object lane 27, the fifth object lane 28, and the sixth object lane 29 indicate each lane of the object lane 20. The object lane 20 has an input guide line 22.

FIG. 8 describes the case of six object lanes and three inputs. As shown in this figure, when the position of moving portion 3 is on the slide level 1, the first object lane 24 to the third object lane 26 can be selected with the input. That is, the first signal input 2A can select the first object lane 24. Also, the second signal input 2B can select the second object lane 25. Further, the third signal input 2C can select the third object lane 26.

And, when the position of moving portion 3 is on the slide level 2, the second object lane 25 to the fourth object lane 27 can be selected with the input. That is, the first signal input 2A can select the second object lane 25. Also, the second signal input 2B can select the third object lane 26. Further, the third signal input 2C can select the fourth object lane 27.

Further, when the position of moving portion 3 is on the slide level 3, the third object lane 26 to the fifth object lane 28 can be selected with the input. That is, the first signal input 2A can select the third object lane 26. Also, the second signal input 2B can select the fourth object lane 27. Further, the third signal input 2C can select the fifth object lane 28.

Still further, when the position of moving portion 3 is on the slide level 4, the fourth object lane 27 to the sixth object lane 29 can be selected with the input. That is, the first signal input 2A can select the fourth object lane 27. Also, the second signal input 2B can select the fifth object lane 28. Further, the third signal input 2C can select the sixth object lane 29.

As is evident from above, there is one way to select the first object lane 24. And, there are two ways to select the second object lane 25. Also, there are three ways to select the third object lane 26. Further, there are three ways to select the fourth object lane 27. Still further, there are two ways to select the fifth object lane 28. Still further, there is one way to select the sixth object lane 29.

Next, embodiments of judgment for the difficulty of the sliding operation is hereinafter explained in detail based on FIGS. 9 to 13.

FIGS. 9 and 10 show an example of player's input method (1) to three objects moving on the object lane 20. Also, FIGS. 11 to 13 show an example of player's input method (2) to similar objects. The example of input method (1) and the example of input method (2) are different input methods.

FIGS. 9 to 13 show embodiments of a game according to the present invention. FIGS. 9 to 13 also show the display screen 19 and the neck portion 4.

The display screen 19 has an object lane 20, a lateral bar graph 23 and a presentation display 31. The object lane 20 has an object button 21 moving downward on the object lane and an input guide line 22. Also the object lane 20 consists of six lanes (first object lane 24 to sixth object lane 29). The neck portion 4 is provided with a moving portion 3. The moving portion 3 is provided with a first signal input 2A, a second signal input 2B and third signal input 2C.

In FIG. 9, the player first selects and inputs the object button 21 on the first object lane 24 that has reached the input guide line 22. That is, moving the position of moving portion 3 to the position of slide level 1 above. And selecting the object button 21 on the first object lane 24 with the first signal input 2A provided to the moving portion 3. While continuing the selection, a player selects and confirms the object button 21 that has reached the input guide line 22 with the timing input means 5.

Next, in FIG. 10, the player selects and inputs the object button 21 on the second object lane 25 that has reached the input guide line 22. That is, moving the position of moving portion 3 to the position of slide level 2 above. And selecting the object button 21 on the second object lane 25 with the first signal input 2A provided to the moving portion 3. While continuing the selection, a player selects and confirms the object button 21 has reached the input guide line 22 with the timing input means 5.

And next, the player selects and inputs the object button 21 on the third object lane 26 that has reached the input guide line 22. That is, selecting the object button 21 on the third object lane 26 with the second signal input 2B provided to the moving portion 3 positioned on the slide level 2 above. While continuing the selection, the player selects and confirms the object button 21 that has reached the input guide line 22 with the timing input means 5. Above is an example of player's input method (1).

Meanwhile, as shown in FIG. 11, the player first selects and inputs the object button 21 on the first object lane 24 which has reached the input guide line 22. That is, moving the position of moving portion 3 to the position of slide level 1 above. And selecting the object button 21 on the first object lane 24 with the first signal input 2A provided to the moving portion 3. While continuing the selection, the player selects and confirms the object button 21 that has reached the input guide line 22 with the timing input means 5.

Next, in FIG. 12, the player selects and inputs the object button 21 on the second object lane 25 that has reached the input guide line 22. That is, moving the position of moving portion 3 to the position of slide level 2 above. And selecting the object button 21 on the second object lane 25 with the first signal input 2A provided to the moving portion 3. While continuing the selection, the player selects and confirms the object button 21 that has reached the input guide line 22 with the timing input means 5.

Next, the player selects and inputs the object button 21 on the third object lane 26 that has reached the input guide line 22. That is, moving the position of moving portion 3 to the position of slide level 3 above. And selecting the object button 21 on the third object lane 26 with the first signal input 2A provided to the moving portion 3. While continuing the selection, the player selects and confirms the object button 21 that has reached the input guide line 22 with the timing input means 5. Above is an example of player's input method (2).

Both of input methods (1) and (2) above are the input methods for an object moving in a same form. The input method (2) is more difficult for a player to perform compared to the input method (1). In such case, the player obtains a high score and a high gage amount when performing the input method (2).

The judgment of difficulty for the sliding operation is not limited to those based on the above embodiments. The judgment of difficulty is performed when one input instruction from a game exists and there are input methods less and more difficult compared to that input instruction.

The present invention is not limited to the above embodiments, and changes can be made. For example, the mock guitar 1 is explained as a controller 10, however, the controller 10 is not limited to a guitar. The controller 10 may be configured to various shapes, such as a piano/key board shape, a trumpet shape, or a mat shape.

Further, in addition to the shapes described in the figures of the present invention, various shapes can be applied to the moving portion 3. For example, another moving means can further be layered onto the moving portion 3.

Also, the object lane 20 and the object 21 can be changed to various forms. For example, the object lane 20 can be arranged vertically and the object 21 may move from left to right of the display.

Further, the object lane 20 may be in a display not considering the depth and the object 21 may drop from the top to the bottom of the screen. In addition, the input guide line 22 may be in a form of a vehicle, such as an airplane or an automobile instead of a fixed line, moving from side to side and up and down to pick up the object 21.

What is claimed is:

1. A game input device comprising a main body portion, a neck portion extending from said main body portion, and a moving portion movably attached to said neck portion, the moving portion including a plurality of signal input portions,
where a position of one of the plurality of the signal input portions at a first slide level is configured to overlap with a position of another of the plurality of the signal input portions at a second slide level; and
wherein a controller located in the game input device outputs a positioning signal or a moving motion signal on said moving portion and an input signal on at least one of said plurality of signal input portions.

2. The game input device according to claim 1, wherein said moving portion is slidably coupled to said neck portion.

3. The game input device according to claim 2, wherein said moving portion is slidably coupled to said neck portion while a portion of said signal input portions is depressed.

4. The game input device according to claim 1, wherein said moving portion is attached slidably in a direction perpendicular to the extension of said neck portion.

5. The game input device according to claim 1, wherein the number of said plurality of signal inputs is three.

6. The game input device according to claim 1, wherein the number of said plurality of signal inputs is four.

7. The game input device according to claim 1, wherein the number of said plurality of signal inputs is five.

8. The game input device according to claim 1, wherein said game input device comprises a guitar shape.

9. A game system comprising a controller and a platform, wherein
said controller has an moving portion and a neck portion, the moving portion comprises an input means having at least two inputs, said moving portion is coupled to said neck portion, and a position of said moving portion is movable on said neck portion;
said platform comprises an input data evaluation portion, and a memory containing game result judgment data;
said controller and said input data evaluation portion are connected through an input/output terminal; and
said controller obtains an operation data input by a player, said operation data is transmitted to said input data evaluation portion through the input/output terminal, said input data evaluation portion receives said game result judgment data, and compares said operation data and said game result judgment data with a plurality of judgment parameters including the timing of an input operation and a sliding distance of said moving portion, thereby evaluating an input operation performed by the player.

10. The game system according to claim 9, wherein said controller and said platform are integrated.

11. The game system according to claim 9, further comprising a display communicating with said memory through the input/output terminal; and
game execution data is transmitted from said memory to said display.

12. The game system according to claim 11, wherein a number of a plurality of object lanes is larger than a number of a plurality of inputs by one when an object lane is displayed on a display screen of said display.

13. The game system according to claim 11, wherein said plurality of judgment parameters includes a color consistency of an input for the input operation and a color of a selected object when an object lane and an object are displayed on the display screen of said display.

14. The game system according to claim 9, wherein said plurality of judgment parameters includes a continuity of an appropriate input operation performed by the player.

* * * * *